No. 894,661. PATENTED JULY 28, 1908.
J. W. KENNEDY.
RIBBON MECHANISM FOR TYPE WRITING MACHINES.
APPLICATION FILED OCT. 30, 1906.

Witnesses:

Inventor:
James W. Kennedy,
By
Atty.

No. 894,661. PATENTED JULY 28, 1908.
J. W. KENNEDY.
RIBBON MECHANISM FOR TYPE WRITING MACHINES.
APPLICATION FILED OCT. 30, 1906.

Witnesses:
G. A. Naubeschmidt
A. H. Peyck

Inventor:
James W. Kennedy
By Geo. E. Waldo, Atty

UNITED STATES PATENT OFFICE.

JAMES W. KENNEDY, OF CHICAGO, ILLINOIS.

RIBBON MECHANISM FOR TYPE-WRITING MACHINES.

No. 894,661.  Specification of Letters Patent.  Patented July 28, 1908.

Application filed October 30, 1906. Serial No. 341,253.

*To all whom it may concern:*

Be it known that I, JAMES W. KENNEDY, a subject of the King of Great Britain, and a resident of Chicago, in the county of Cook and State of Illinois, have invented certain new and useful Improvements in Ribbon Mechanism for Type-Writing Machines, of which the following is a specification.

This invention relates to ribbon mechanism for typewriting machines.

In typewriting machines it frequently happens that it is desired to do different kinds of work, either work of different colors or record and copying. So far as I am aware, this has heretofore been effected by the use of a single ribbon comprising distinct portions of different character, either of different colors or part record and part copying, which extend lengthwise of the ribbon, each occupying its appropriate portion of the width of the ribbon and the different kinds of work being secured by shifting the ribbon different distances so that one portion or the other thereof will overlie the platen and be presented to the type in the operation of the machine, as may be desired. This construction and method of operation is objectionable, first, because, owing to the limitation as to the width of the ribbon, the different portions of the ribbons are so narrow that the mechanism has to be so fine and delicately adjusted that it is practically impossible to secure reliable results, in operation, often resulting in confusion of the different characters of work and thus defeating the very object sought to be attained; second, because, due to the fact that one character of print is used much more than the other, one portion of the ribbon is worn out long before the other, thus necessitating replacing the entire ribbon while a portion of it is still good and consequently resulting in loss to the user; third, due to the narrowness of the different portions of the ribbon, it is impossible to provide any lateral traverse thereto in operation so that the type always strike on a straight line, thus wearing the ribbon out and exhausting the ink contained therein much more rapidly than where the ribbon has a traverse, which causes the type to strike at different points transversely of the ribbon, distributing both the wear and the consumption of ink.

The primary object of my invention is to overcome these objectionable features and I attain this result by providing separate ribbons for the different characters of work desired in connection with operating and controlling mechanism, whereby, as the machine is operated, either ribbon mechanism may be released and actuated so that the ribbon controlled thereby will receive the impression and the other will be disengaged and locked against operation, thereby permitting the use of ribbons of standard width and securing and insuring uniformity of operation under all conditions.

The invention also consists of the various other features, combinations of features and details of construction hereinafter described and claimed.

In the accompanying drawings, in which my invention is fully illustrated, Fig. 12 is a detail view of a portion of the front of the machine showing an indicator plate in connection with the shift lever for conveniently and correctly indicating the character of the work for which the machine is set at any time; and Fig. 13 is an isometric view showing the means for supporting the ribbon bobbers in normal or depressed positions.

For purposes of concrete illustration, I have, in the accompanying drawings, shown my improved ribbon mechanism as applied to or embodied in a typewriting machine of the kind known, commercially, as the "Underwood" typewriter. As regards its usual features, the construction and operation of said machine is familiar to most persons skilled in the typewriter art and will require no extended detailed description thereof.

For purposes of reference, various parts of the machine are designated in the drawings as follows:—A, the frame of the machine, B, the platen, B¹ the platen carriage, C the disk in which the type bars C¹ are pivoted, D the universal bar connected to the rocker rod D¹ by the arms d and the skeleton plate d¹, E the keys, E¹ the key levers, F the space bar, F¹ the space bar lever, G the ratchet wheels through which the feeding of the ribbon is effected, G¹ the actuating and G² the retaining pawls coöperating with said ratchet wheel, and H the rod or bar upon which the platen frame is supported and by movement of which said platen is shifted from lower to upper case and vice versa.

I will now describe my improved ribbon mechanism.

Ribbons 1 and 2 of different character, as a record ribbon and a copying ribbon or different colored ribbons, are wound on separate spools 3 and 4 secured to rotate with vertically disposed shafts 5 revolubly mounted in suitable bearings at opposite sides of the machine and to which step by step rotation is imparted, as the machine is operated, by means of suitable driving connection with the feed ratchets G. As shown, said spools 3 and 4 are secured to the shafts 5, so that they can be quickly and conveniently removed therefrom, in the following manner:— Secured to the shafts 5 at a point to define the proper positions, vertically, of said spools 3 and 4, are collars 6 secured in which are pins 7 adapted to engage corresponding holes in the lower spool and, in like manner, pins 8 secured in the lower spool are adapted to engage holes in the upper spool. With this construction it is obvious that both spools will be secured to the shaft 5 and may, at the same time be lifted off from the same whenever it is desired to remove them.

The spools 3 and 4 are inclosed in fixed casings 9, which are open at the top to permit the removal of the spools and which are provided with suitable guide slots 10 and 11, one for each ribbon.

Where the ribbon does not pass straight between its spools, as is the case with the lower ribbon in the drawings, the sides of the guide slots 11 against which the ribbons bear are preferably disposed at angles to the axles of the spools, in order to maintain the ribbon flat both upon and between its spools.

My improved ribbon mechanism comprises two ribbon bobbers 12 and 13, one for each ribbon 1 and 2, said bobbers and the ribbons which they respectively carry being arranged one directly in front of the other. As regards their usual features, said ribbon bobbers may be of any desired or approved construction and will be readily understood by those familiar with the art from an inspection of the drawings without a detailed description thereof. As shown, said ribbon bobbers are guided in their vertical movement by means of clips 14 thereon which respectively engage the edges of the type bar guide 15 and of a piece 16 secured to the machine frame and by screws 17 which engage suitable guide slots in downward extensions 18 and 19 of said ribbon bobbers 12 and 13, respectively, said downward extensions 18 and 19 of said ribbon bobbers being offset towards opposite sides to bring the same in desired relation to parts of the mechanism which engage the same for operation.

Figures 4, 6:
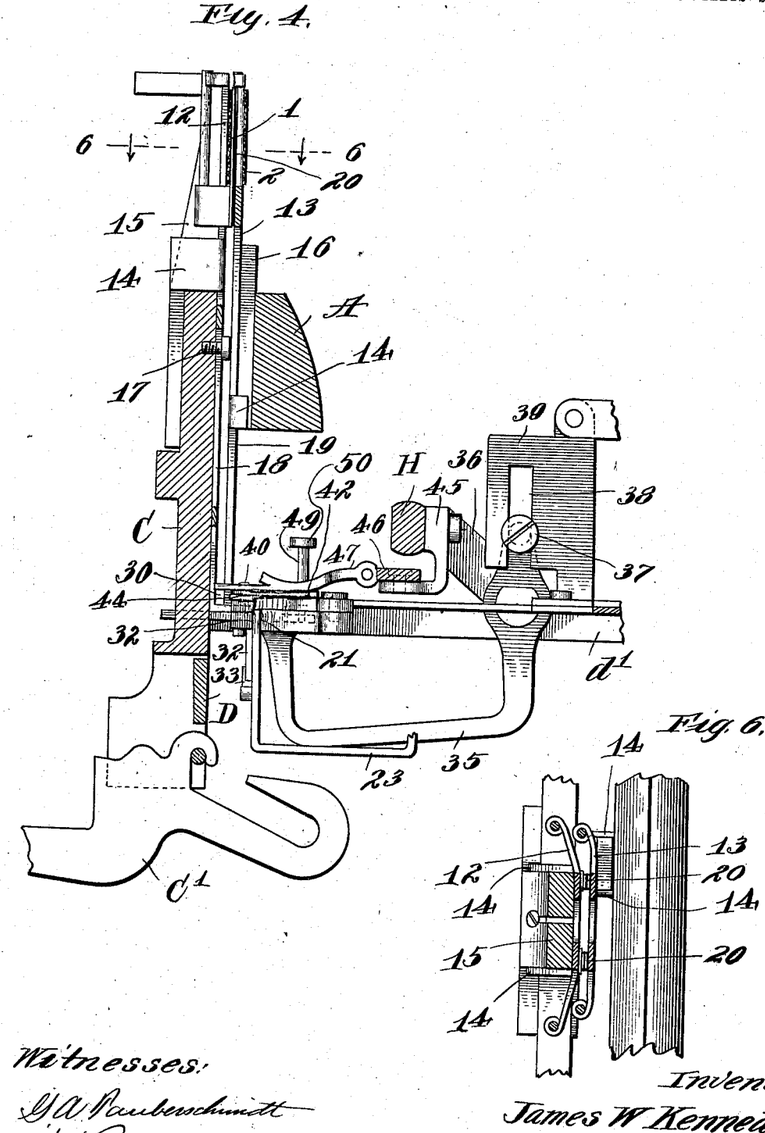
Fig. 4 is a partial sectional elevation on an enlarged scale, taken approximately on the line 4—4 of Fig. 3.
Fig. 6 is an enlarged plan section of the ribbon bobbers on the line 6—6 of Fig. 4.

In order that, in operation, the ribbon bobbers and the ribbons respectively carried thereby may not catch upon each other and thus interfere with their designed operation, said ribbon bobbers are normally held apart by means of springs 20, which, as shown, are secured to the ribbon bobber 12 and bear against the adjacent side of the bobber 13, as best shown in Fig. 6.

Figures 2, 15:
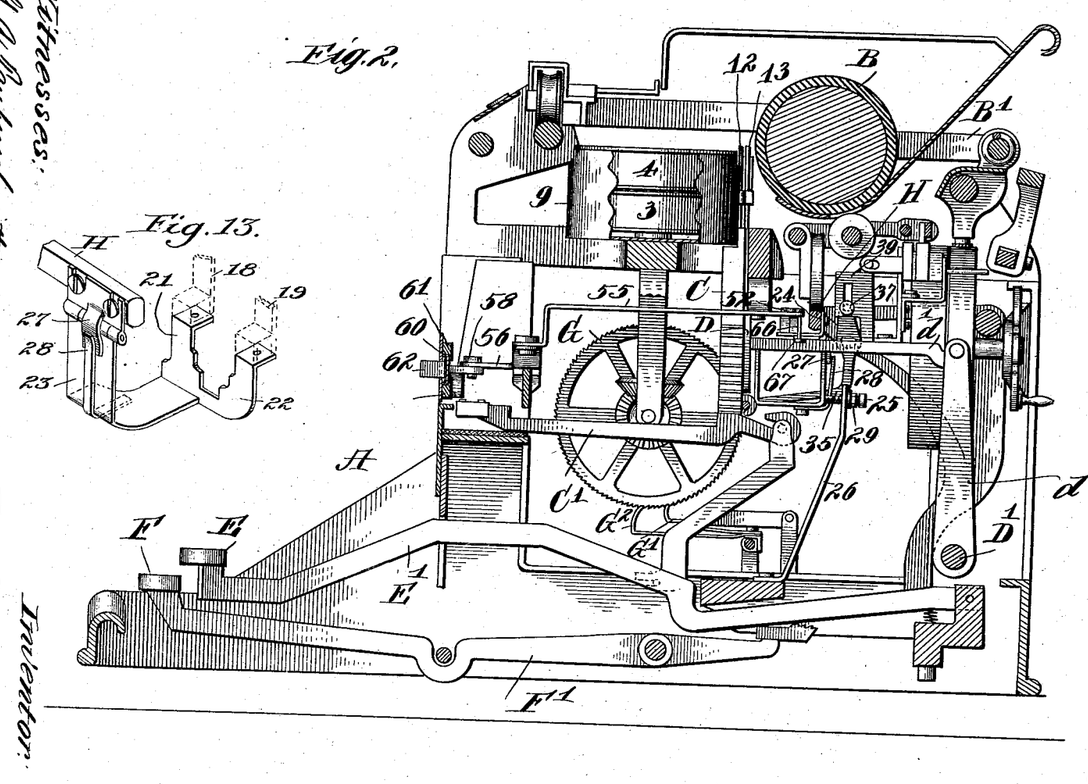
Fig. 2 is a central sectional view thereof showing my improved ribbon mechanism in side elevation.

When in normal or depressed position, the lower ends of the downward extensions 18 and 19 of the ribbon bobbers 12 and 13 rest and are supported upon the upper ends of arms 21 and 22 formed on a plate 23 carried by the platen frame supporting bar H, as clearly shown in Fig. 4 of the drawings. Said plate 23, being carried by the platen supporting rod H, it is obvious that, when said rod H is raised or lowered in order to shift from lower to upper case or vice versa, said plate 23 will be correspondingly raised or lowered, thus maintaining the ribbon bobbers in proper operative position relatively to the platen. In the type of machine shown in the drawings, however, the platen supporting frame is pivoted to the carriage at a point in the rear of said platen, so that, in shifting, the platen will move on the arc of a circle, and the plate 23, on which the bobber supporting arms 21 and 22 are formed, being carried by the platen frame supporting rod H and extending a considerable distance in front thereof, will travel through a considerably longer arc than the platen which would bring the ribbons 1 and 2 into improper relation to said platen. To prevent this, said plate 23, instead of being rigidly secured to the platen supporting rod H, is hinged to a plate 24 on said rod. When at the lower limit of its movement, the plate 23 is maintained in operative position by means of rigid stops consisting, as shown, of screws 25 threaded through the upper end of an arm 26 rigidly secured to the frame of the machine, as clearly shown in Fig. 2. With this construction it is obvious that, when said plate 23 is in depressed position the ends of the arms 21 and 22 which support the ribbon bobbers may be adjusted vertically by means of the stop screws 25, which thus provide convenient means for adjusting the position of the ribbon bobbers to bring the same into proper operative relation to the platen when in its depressed position. When the platen supporting rod H is raised to shift the platen, the plate 23 passes out of contact with the stop screws 25 and is maintained in operative position by means of a stop finger 27 on the plate 24, which extends downwardly so as to bear against the rear side of the plate 23. While the weight of the plate 23 and of the parts carried thereby would doubtless be sufficient to hold said plate at the lower limit of its pivotal movement, as defined either by the stop screws 25 or the stop finger 27, I prefer to supplement the gravity of the parts by means of a spring 28 secured to said plate 23 and which bears against the rear side of the stop finger 27. Said stop finger 27 is so positioned that, when the platen supporting rod H is in raised position, said stop finger will support the plate 23 in position to bring the ribbon bobbers in proper operative position relatively to the platen, while, by adjusting the stop screws 25 so that they will contact with the rear side of the plate 23 at a proper point before the rod or bar H reaches its lowermost position, said plate will be swung on its hinge a sufficient distance to compensate for the difference between the travel of the platen and of the arms 21 and 22 to bring the ribbon bobbers in proper operative position relatively to the platen when in lowered or depressed position. The stop screws 25 may be secured in desired adjusted position by means of suitable lock nuts thereon.

Formed in the lower ends of the downward extensions 18 and 19 of the ribbon bobbers are holes or openings 30, which, as shown, are formed by bending the ends of said downward extensions 18 and 19 into the form of loops, the lower flat sides of which are adapted to rest upon the upper ends of the arms 21 and 22. The loops or holes 30 are adapted to be engaged by catches 31 on a slide 32 mounted, so as to be transversely movable, at the upper ends of the arms 21 and 22, as shown, by means of screws which extend through suitable slots formed in said slide 32, the relation being such that when one of the catches 31 is in engagement with the hole or loop 30 in one of the ribbon bobbers, the other of said catches will be disengaged from the hole or loop 30 in the other of said ribbon bobbers, thus leaving the second ribbon bobber free to move under the influence of the bobber operating lever, while the first ribbon bobber will be locked against movement by means of the catch 31 in engagement with the hole or loop 30 and by moving said slide so as to cause a catch 31 thereon to engage the loop or hole 30 in one or the other of the ribbon bobbers, either of said bobbers may be rendered operative as desired, while the other will be locked against movement. In order that the jar incident to the operation of the machine may not cause the slide 32 to shift accidentally, I provide a spring catch 33 adapted to engage suitable notches 34 formed in the lower edge of the slide 32. The shape of the spring catch 33 is such, however, that it will readily disengage itself when it is desired to shift the slide 32 by means of the mechanism provided.

The ribbon bobbers 12 and 13 are adapted to be raised so as to bring the ribbons carried thereby respectively between the platen and the type by means of a bobber operating lever 35 pivoted to a bracket 36 secured to the platen frame supporting bar H, desired pivotal movement being imparted to said lever by means of a stud 37 thereon which engages a vertical slot 38 formed in a bracket 39 carried on the plate $d^1$ connected with the universal bar D.

The front end of the lever 35 extends between the arms 20 and 21 of the plate 23 and mounted in suitable bearings in guide lugs 40 thereon so as to be transversely movable, is a locking pin 41 which is adapted to enter the holes or loops 30 in the lower ends of the ribbon bobbers as said pin is moved in one direction or the other, thus locking one or the other of said ribbon bobbers to said lever 35, the length of the locking pin 41 being such that when said locking pin is in engagement with the hole or loop 30 in one of said ribbon bobbers it will be disengaged from the other.

Engagement and disengagement of the catches 31 and of the locking pin 41 with the holes or loops 30 in the ribbon bobbers, is adapted to be effected in the following manner:—Pivoted to the lever 35 in the rear of the locking pin 41 is a member 42 comprising a pin or arm 43 which engages a hole or opening formed in the locking pin 41 and a yoke 44 the ends of which embrace the opposite ends of the slide 32. Thus, as the member 42 is moved pivotally in either direction, it will cause the locking pin 41 to engage the hole or loop 30 in the ribbon bobber towards which it is swung and will withdraw it from the other and will at the same time, through the medium of the yoke 44, impart movement to the slide 32 to disengage the catch 31 from the hole or loop 30 in the ribbon bobber engaged by the locking pin 41 and to engage the other of said catches 31 with the hole or loop 30 in the other of said ribbon bobbers. Thus one of said ribbon bobbers will be locked against movement while, at the same time, the other will be locked to the bobber operating lever 35 so that pivotal movement of said lever will raise said ribbon bobber.

Pivotal movement is adapted to be imparted to the member 42 for the purpose of operating the lock catches 31 and the locking pin 41 in the following manner;—Pivoted to a bracket 45 secured to the platen frame supporting bar H, is a lever 46 an arm 47 on which is provided with a slot 48 which embraces a stud pin 49 secured in the member 42 in front of its point of pivotal attachment to the lever 35. In order to permit the arm 47, which is carried by the platen supporting bar H, to move with the lever 34 as the same moves pivotally, said arm 47 is hinged to the lever 46 which, while permitting said arm 47 to move vertically, will cause the same to turn laterally with said lever 46. To prevent binding of said arm 47 on the stud pin 49, said pin is elongated and to prevent disengagement of said hinged arm from said stud, said stud pin is provided with a head 50.

Figures 1, 16:
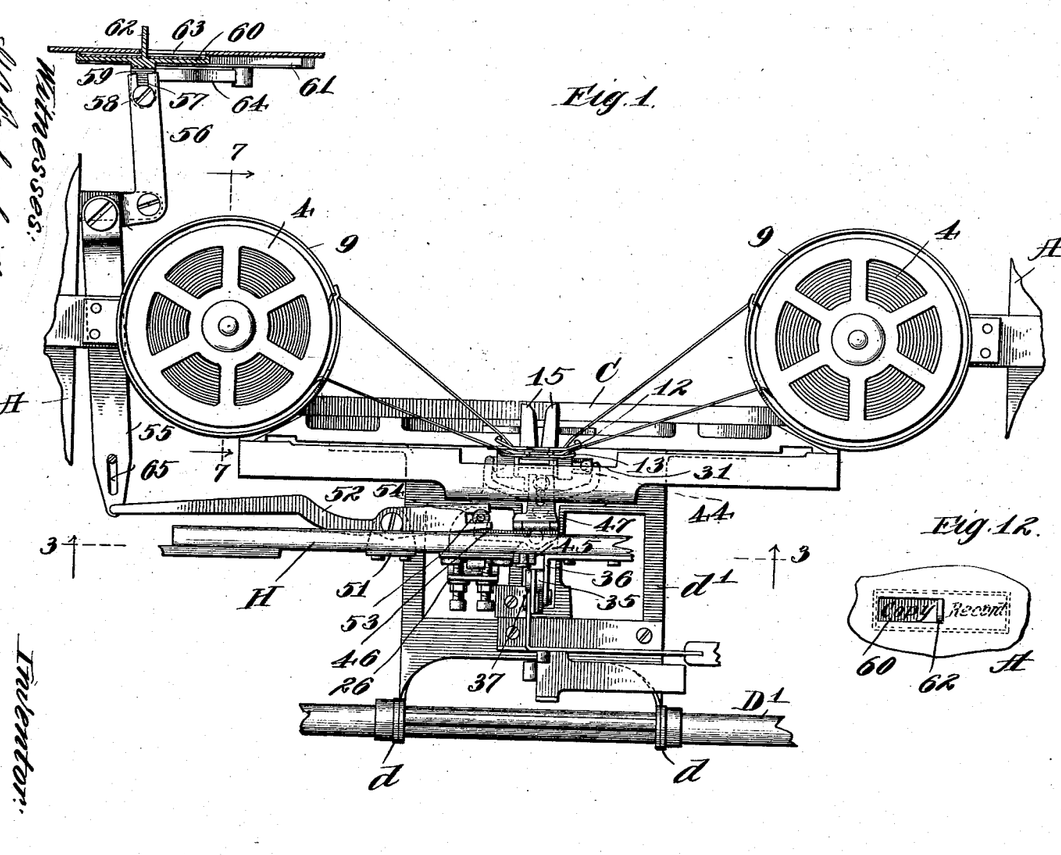
—Figure 1 is a partial top plan view, partly in section, of a typewriting machine embodying my invention.

Necessary pivotal movement for operating the catches 31 and the locking pin 41 is adapted to be imparted to the lever 46 in the following manner:—Pivoted between its ends to a bracket 51 secured to the platen frame supporting bar H, is a lever 52, having a slot 53 in one end adapted to engage a stud 54 secured in the lever 46. The opposite end of said lever 52 is connected by means of a rod or bar 55 with one end of a bell crank lever 56 pivoted to a rigid portion of the frame of the machine. Formed in the opposite end of said bell crank lever 56 is a slot 57 which engages a stud 58 secured in a bracket 59 formed on a slide 60 which is fitted to and longitudinally movable in suitable transverse guides 61 on the machine frame. Movement is adapted to be imparted to the slide 60 by means of a projection 62 thereon which extends through a suitable slot 63 formed in the front of the machine frame, all as clearly shown in Fig. 1 of the drawings. The slide 60 is adapted to be maintained normally at the limit of its movement in either direction by a leaf spring 64 which bears against the bracket 59 and is provided with sections which incline in opposite directions.

Indexes on the portions of the slide 60 which are exposed when said slide is at the limit of its movement in opposite directions are adapted to indicate the character of the work for which the machine is set at any time, as indicated in Fig. 12 of the drawings.

As shown, the connecting bar or rod 55 is guided by means of a screw which passes through a slot 65 therein and is threaded into a rigid portion of the machine frame. The lever 52 being carried on the platen frame supporting bar H and hence movable therewith, while the rod or bar 55 is supported in fixed adjustment, I connect said rod or bar 55 to said lever 52 by means of a pin 66 of suitable length to provide for necessary movement of the lever 52 the opposite ends of which are preferably secured in the lever 52 and in a brace or bracket 67 secured to said lever.

Figures 3, 10, 11:
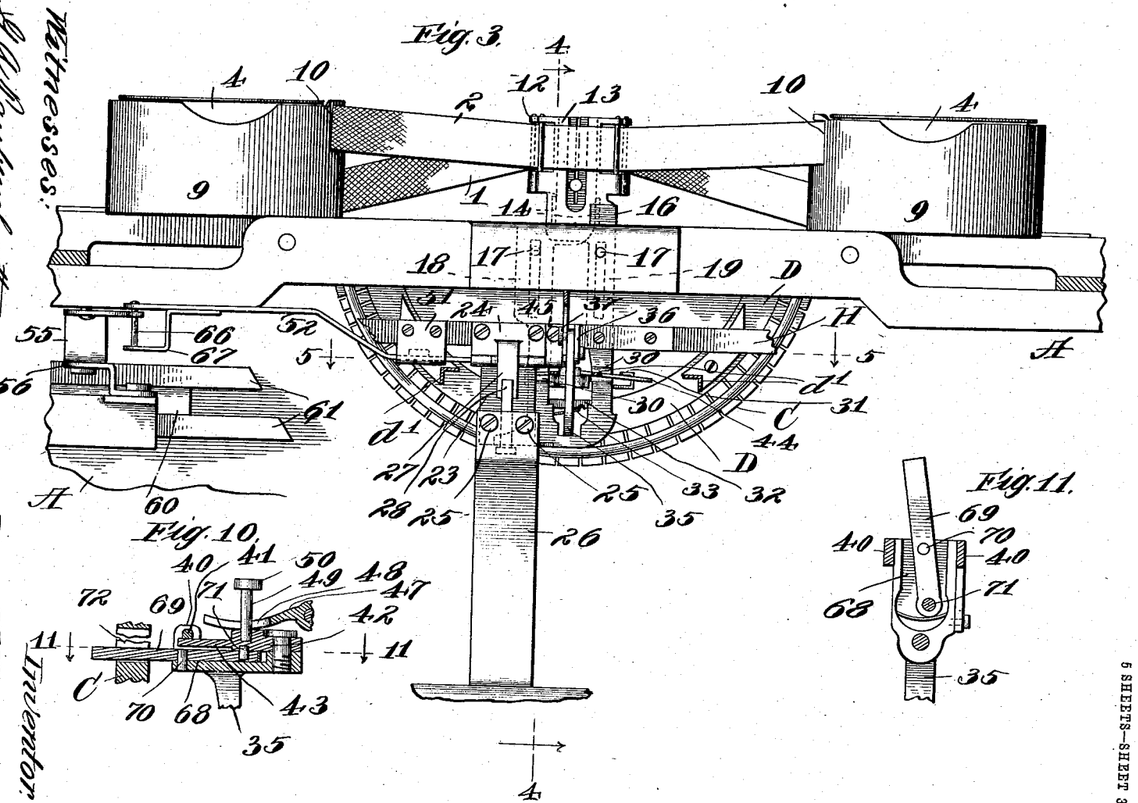
Fig. 3 is a rear sectional elevation of the machine, on the line 3—3 of Fig. 1.
Fig. 10 is a detail sectional view on the line 10—10 of Fig. 5.
Fig. 11 is a detail section on the line 11—11 of Fig. 10.
Figure 5:
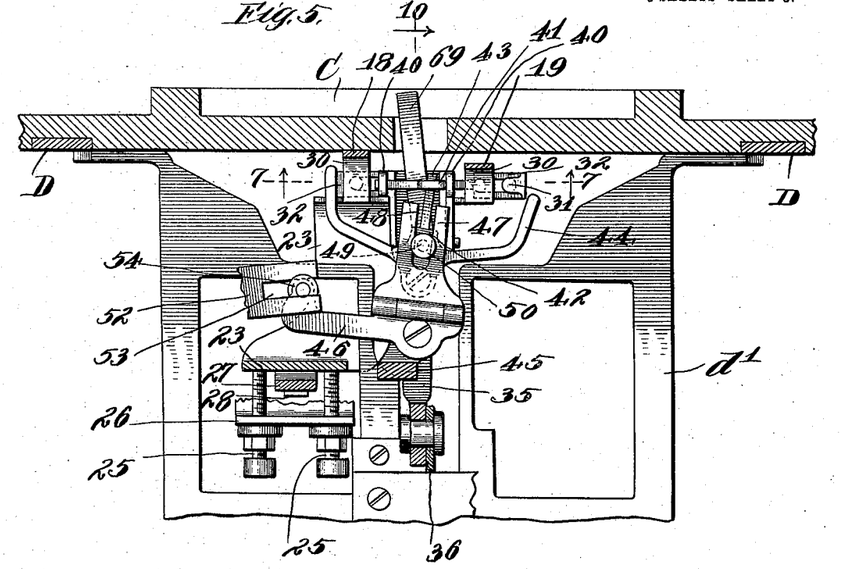
Fig. 5 is a partial enlarged plan section, taken approximately on the line 5—5 of Fig. 3.
Figure 7:
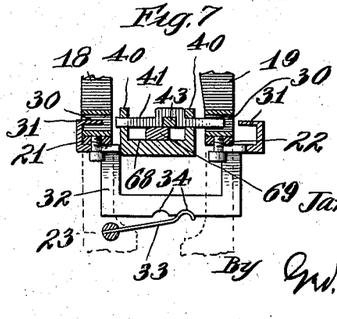
Fig. 7 is a partial enlarged sectional view on the line 7—7 of Fig. 5.
Figure 8:
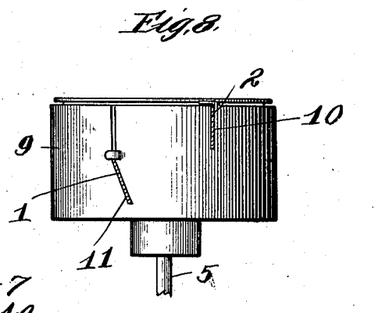
Figs. 8 and 9 are, respectively, an enlarged side elevation and a vertical sectional view of one of the ribbon spools.
Figure 9:
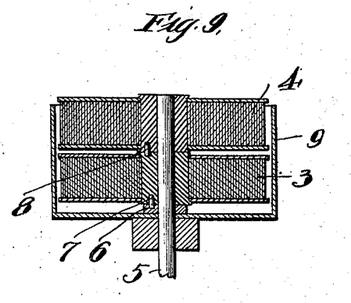

For convenience I prefer to provide, in addition to the device last above described for effecting engagement and disengagement of the catches 31, and the locking pin 41 with the holes or loops 30 in the ribbon bobbers, a second device for imparting necessary pivotal movement to the arm 47, which will be accessible for operation at the front of the disk C. These means are as follows, as best shown in Figs. 5, 10 and 11 of the drawings. Formed in the lever 35 below the member 42 is a slot or recess 68 in which the lever 69 is pivoted between its end upon a pin or stud 70 secured in the lever 35 and at its rear end to the member 42 by means of a pin 71. The front end of said lever 69 projects through a slot 72 formed in the disk C a sufficient distance so that said end will be accessible for the purpose of moving the same pivotally.

As used in the claims, the word "frisket" is synonomous with the word "bobber"

I claim:—

1. In a typewriting machine, the combination of two ribbon bobbers, a support for said ribbon bobbers and a lock mechanism for separately securing said ribbon bobbers against movement.

2. In a typewriting machine, the combination of two ribbon bobbers, a support for said ribbon bobbers, a lock mechanism for separately securing said bobbers against movement and manually operated means controlling said lock mechanism.

3. In a typewriting machine, the combination of two ribbon bobbers, a single lever for operating said bobbers and means for separately engaging said bobbers with said lever.

4. In a typewriting machine, the combination of two ribbon bobbers, a single lever for operating said bobbers, means for separately engaging said bobbers with said lever and manually operated means for controlling said engaging mechanism.

5. In a typewriting machine, the combination of two ribbon bobbers, a support for said ribbon bobbers, a lock mechanism for separately securing said bobbers against movement, a bobber operating lever and means for separately engaging said bobbers with said lever.

6. In a typewriting machine, the combination of two ribbon bobbers, a support for said ribbon bobbers, a lock mechanism for separately securing said bobbers against movement, a bobber operating lever, means for separately engaging said bobbers with said lever and manually operated means for simultaneously actuating said lock mechanism and the means for engaging said bobbers with said bobber operating lever.

7. In a typewriting machine, the combination of two ribbon bobbers, a support for said ribbon bobbers, a lock mechanism mounted on said support for separately securing said bobbers against movement, a bobber operating lever and means for separately engaging said ribbon bobbers with said lever, both said bobber support and said bobber operating lever being shiftable with the platen.

8. In a typewriting machine, the combination of two ribbon bobbers, a support for said ribbon bobbers, a lock mechanism mounted on said support for separately securing said bobbers against movement, a bobber operating lever, means for separately engaging said bobbers with said lever, both said support and said bobber operating lever being shiftable with the platen and manually operated means for simultaneously actuating said lock mechanism and the means for engaging said bobbers with said bobber operating lever.

9. In a typewriting machine comprising a shiftable platen frame supporting bar, the combination of two ribbon bobbers, a support for said ribbon bobbers secured to said bar and a lock mechanism mounted on said support for separately securing said ribbon bobbers against movement.

10. In a typewriting machine comprising a shiftable platen frame supporting bar, the combination of two ribbon bobbers, a support for said ribbon bobbers hinged to said bar, a finger adapted to engage said hinge support beyond its hinge and a stop adapted to engage said hinge support to impart movement thereto to compensate for the difference between the angular travel of said hinged support and of the platen.

11. In a typewriting machine comprising a shiftable platen frame supporting bar, the combination of two ribbon bobbers, a support for said ribbon bobbers hinged to said bar, a finger adapted to engage said hinged support beyond its hinge and an adjustable stop adapted to engage said hinged support to impart movement thereto to compensate for the difference between the angular travel of said hinged support and of the platen.

12. In a typewriting machine comprising a shiftable platen frame supporting bar, the combination of two ribbon bobbers, a support for said ribbon bobbers secured to said bar, a slide mounted on said support and lock catches on said slide, said ribbon bobbers being provided with holes adapted to receive said lock catches.

13. In a typewriting machine comprising a shiftable platen frame supporting bar, the combination of two ribbon bobbers, a support for said ribbon bobbers secured to said bar, a slide mounted on said support, lock catches on said slide, said ribbon bobbers being provided with holes adapted to receive said lock catches, and manually operated means for imparting movement to said slide.

14. In a typewriting machine comprising a shiftable platen frame supporting bar, the combination of two ribbon bobbers, a support for said ribbon bobbers secured to said bar, a slide mounted on said support, lock catches on said slide, said ribbon bobbers being provided with holes adapted to receive said lock catches, manually operated means for imparting movement to said slide and means for securing said slide in position with a lock catch thereon in engagement in a hole in a ribbon bobber.

15. In a typewriting machine comprising a shiftable platen frame supporting bar, the combination of two ribbon bobbers, a support for said ribbon bobbers, secured to said bar, a slide mounted on said support, lock catches on said slide, said ribbon bobbers being provided with holes adapted to receive said lock catches and manually operated means for imparting movement to said slide, comprising a pivoted yoke the ends of which embrace the opposite ends of said slide.

16. In a typewriting machine comprising a shiftable platen frame supporting bar, the combination of two ribbon bobbers, a support for said ribbon bobbers secured to said bar, a bobber operating lever pivoted to said bar and a locking pin movably mounted in said bobber operating lever, said ribbon bobbers being provided with holes adapted for engagement by said locking pin.

17. In a typewriting machine comprising a shiftable platen frame supporting bar, the combination of two ribbon bobbers, a support for said ribbon bobbers secured to said bar, a bobber operating lever pivoted to said bar, a locking pin movably mounted in said lever, said ribbon bobbers being provided with holes adapted for engagement by said locking pin and manually operated means for imparting movement to said locking pin.

18. In a typewriting machine comprising a shiftable platen frame supporting bar, the combination of two ribbon bobbers, a support for said ribbon bobbers secured to said bar, a bobber operating lever pivoted to said bar, a locking pin movably mounted on said lever, said ribbon bobbers being provided with holes adapted for engagement by said locking pin and manually operated means for imparting movement to said locking pin comprising a pivoted member and a pin thereon which engages said locking pin.

19. In a typewriting machine comprising a shiftable platen frame supporting bar, the combination of two ribbon bobbers, a support for said ribbon bobbers secured to said bar, a bobber operating lever pivoted to said bar, a slide mounted on said bobber support, lock catches thereon and a pin movably mounted on said bobber operating lever, said ribbon bobbers being provided with holes to receive said lock catches and said locking pin.

20. In a typewriting machine comprising a shiftable platen frame supporting bar, the combination of two ribbon bobbers, a support for said ribbon bobbers secured to said bar, a bobber operating lever pivoted to said bar, a slide mounted on said bobber support, lock catches thereon and a pin movably mounted on said bobber operating lever, said ribbon bobbers being provided with holes to receive said lock catches and said locking pin and manually operated means for imparting movement to said slide and to said locking pin.

21. In a typewriting machine comprising a shiftable platen frame supporting bar, the combination of two ribbon bobbers, a support for said ribbon bobbers secured to said bar, a bobber operating lever pivoted to said bar, a slide mounted on said bobber support, lock catches thereon and a pin movably mounted on said bobber operating lever, said ribbon bobbers being provided with holes to receive said lock catches and said locking pin and manually operated means for imparting movement to said slide and locking pin, comprising a member pivoted on said bobber operating lever and projections thereon which engage said slide and said locking pin respectively.

22. In a typewriting machine comprising a shiftable platen frame supporting bar, the combination of two ribbon bobbers, a support for said ribbon bobbers secured to said bar, a bobber operating lever pivoted to said bar, a slide mounted on said bobber support, lock catches thereon and a pin movably mounted on said bobber operating lever, said ribbon bobbers being provided with holes to receive said lock catches and said pin, and manually operated means for imparting movement to said slide and locking pin comprising a member pivoted on said bobber operating lever comprising a yoke which embraces the ends of said slide and a pin which engages said locking pin.

23. In a typewriting machine, the combination of two ribbon bobbers, a support therefor, a slide mounted on said support, lock catches thereon, a bobber operating lever, a locking pin movably mounted thereon, said ribbon bobbers being provided with holes adapted to receive said lock catches and said locking pin and means for imparting movement to said slide and pin comprising a member pivoted on said bobber operating lever, projections thereon which respectively engage said slide and locking pin, a stud pin secured in said pivoted member, a pivoted lever and an arm thereon which engages said stud pin.

24. In a typewriting machine comprising a shiftable platen frame supporting bar, the combination of two ribbon bobbers, a support for said ribbon bobbers secured to said bar, a bobber operating lever pivoted to said bar, a slide mounted on said ribbon bobber support, lock catches thereon and a pin movably mounted on said bobber operating lever, said bobbers being provided with holes to receive said lock catches and said locking pin and manually operated means for imparting movement to said slide and locking pin comprising a member pivoted on said bobber operating lever, projections thereon which engage said slide and said locking pin, a stud pin secured in said pivoted member, a lever pivoted upon the platen frame supporting bar and a forked arm hinged thereto which embraces the stud pin on said pivoted member.

25. In a typewriting machine comprising a shiftable platen frame supporting bar, the combination of two ribbon bobbers, a support for said ribbon bobbers secured to said bar, a bobber operating lever pivoted to said bar, a slide mounted on said ribbon bobber support, lock catches thereon and a pin movably mounted on said bobber operating lever, said bobbers being provided with holes to receive said lock catches and said locking pin and manually operated means for imparting movement to said slide and locking pin comprising a member pivoted on said bobber operating lever, projections thereon which engage said slide and said locking pin, a headed stud pin secured in said pivoted member, a lever pivoted upon the platen frame supporting bar and a forked arm hinged thereto which embraces the headed stud pin on said pivoted member.

26. In a typewriting machine comprising a shiftable platen frame supporting bar, the combination of two ribbon bobbers, a support for said ribbon bobbers secured to said bar, a bobber operating lever pivoted to said bar, a slide mounted on said ribbon bobber support, lock catches thereon and a pin movably mounted in said bobber operating lever, said bobbers being provided with holes to receive said lock catches and said locking pin and manually operated means for imparting movement to said slide and locking pin comprising a member pivoted on said bobber operating lever, projections thereon which engage said slide and said locking pin, an elongated headed stud pin secured in said pivoted member, a lever pivoted upon the platen frame supporting bar and a forked arm hinged thereto which embraces the elongated headed stud pin on said pivoted member.

27. In a typewriting machine comprising a shiftable platen frame supporting bar, the combination of two ribbon bobbers, a support therefor and a bobber operating lever both carried on said platen frame supporting bar, means for separately engaging said ribbon bobbers with said ribbon bobber support and with said bobber operating lever, respectively, and means for operating the same comprising levers pivoted on the machine frame and on the platen frame supporting bar, respectively, a rod connecting said levers mounted in fixed guides on the machine frame, the connection between said rod and the lever pivoted on the platen frame supporting bar comprising an elongated pin secured in one and engaging a suitable bearing in the other.

28. In a typewriting machine, the combination with two ribbon bobbers, a support therefor, means for separately actuating the same and a manually operated lever for controlling said actuating mechanism which projects through the front of the machine, of a slide connected to said lever which extends on both sides of said lever so as to be exposed at opposite sides thereof when said lever is at the limit of its movement in either direction and indexes on said slide to indicate the character of the work for which the machine is set.

29. In a typewriting machine, the combination of two ribbon bobbers mounted adjacent to each other and a spring inserted between said bobbers for holding them apart.

30. In a typewriting machine, the combination of a plurality of ribbon bobbers normally registering one with the other and rotatable ribbon spools each comprising a plurality of sections arranged on a single shaft and adapted for receiving different ribbons for different ribbon bobbers.

In testimony, that I claim the foregoing as my invention, I affix my signature in presence of two subscribing witnesses, this 27th day of October, A. D. 1906.

JAMES W. KENNEDY.

Witnesses:
CHARLES B. GILLSON,
E. M. KLATCHER.